United States Patent [19]

Ingalls

[11] Patent Number: 4,795,187
[45] Date of Patent: Jan. 3, 1989

[54] KING PIN MEMBER FOR ADJUSTING CAMBER, AND METHOD

[75] Inventor: William E. Ingalls, Longmont, Colo.

[73] Assignee: Thomas W. O'Rourke, Boulder, Colo.; a part interest

[21] Appl. No.: 110,929

[22] Filed: Oct. 20, 1987

[51] Int. Cl.⁴ ............................................. B62D 17/00
[52] U.S. Cl. ......................................... 280/661; 403/4
[58] Field of Search .................... 280/661, 95 R, 96.1; 180/253; 403/4, 161, 162, DIG. 8

[56] References Cited

U.S. PATENT DOCUMENTS

| | | | |
|---|---|---|---|
| 4,037,680 | 7/1977 | Grove | 180/43 R |
| 4,232,880 | 11/1980 | Dickerson et al. | 280/661 |
| 4,252,338 | 2/1981 | Ingalls et al. | 280/66 |
| 4,400,007 | 8/1983 | Ingalls | 280/661 |
| 4,420,272 | 12/1983 | Ingalls et al. | 280/661 |

FOREIGN PATENT DOCUMENTS 92264  5/1984  Japan .................................. 280/661

Primary Examiner—David M. Mitchell
Assistant Examiner—Ross Weaver
Attorney, Agent, or Firm—Robert E. Harris

[57] ABSTRACT

A king pin member in the form of a plate portion adapted to index to a spindle knuckle, and a king pin stub extending from the plate portion in one of several positions offset from the indexing member, and thus from the nominal location of the king pin stub, such that the king pin member may be positioned in the spindle knuckle and engage an axle terminus to rotate the spindle knuckle to a desired orientation relative to the axle terminus to adjust and correct the camber relationship of a wheel journalled to the spindle knuckle. The offset king pin stub may be rotatable relative to the plate portion to provide variable offsets. By first measuring the camber maladjustment and selecting the king pin member with an appropriate offset king pin stub, camber corrections can be made. In particular applications, two corrective king pin members may be desirable to maintain the spindle knuckle and axle terminus geometry. Also, in some applications a two axis king pin stub may be necessary to facilitate installation of the kind pin member in the spindle knuckle.

5 Claims, 2 Drawing Sheets

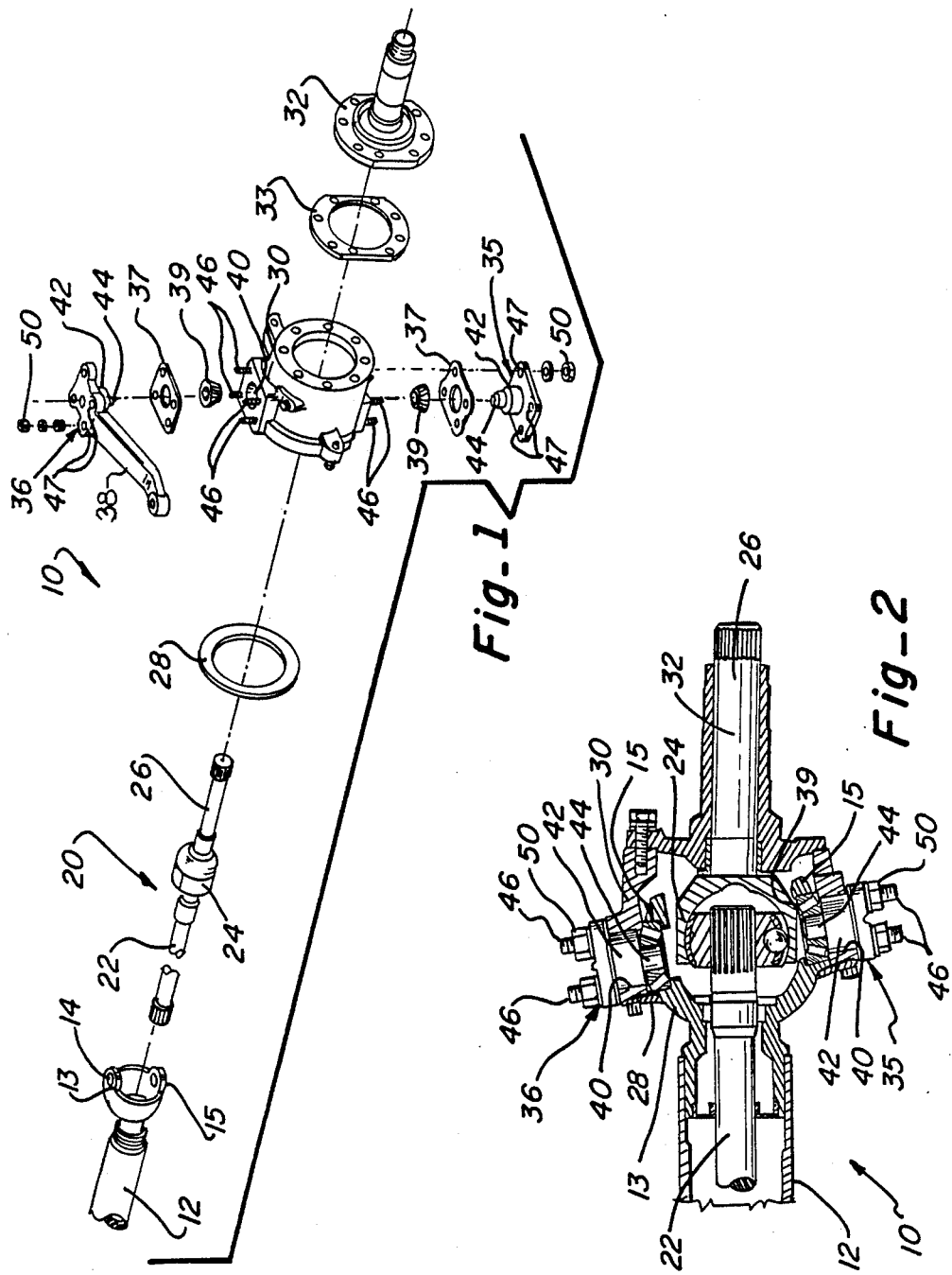

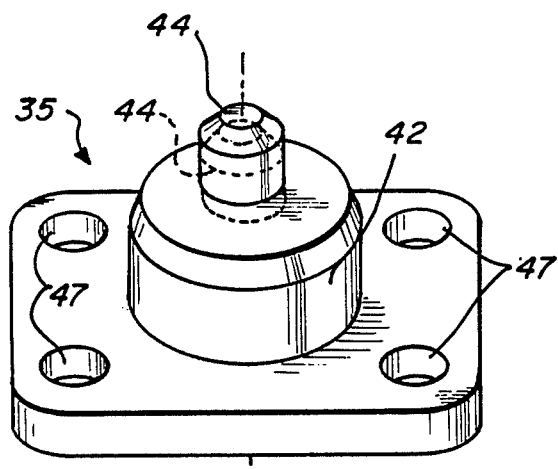
Fig_3
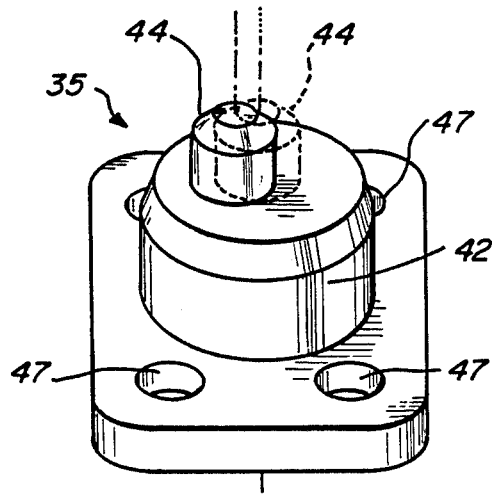
Fig_4
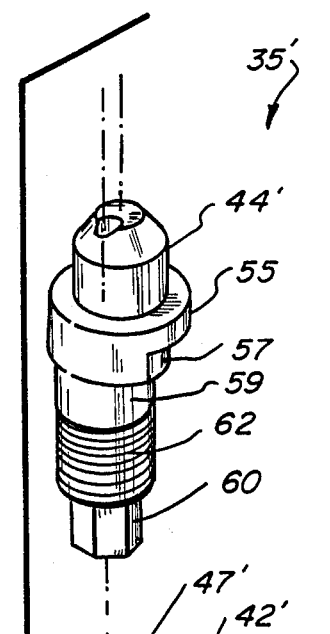
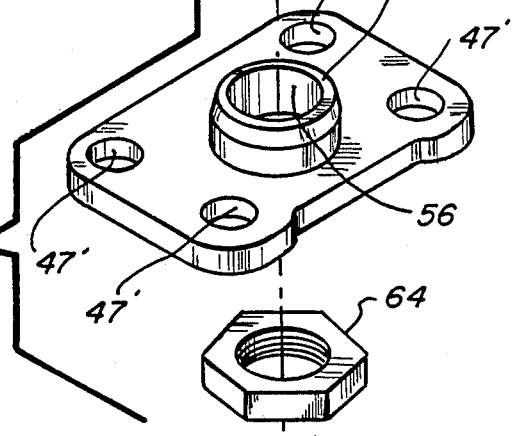
Fig_5

KING PIN MEMBER FOR ADJUSTING CAMBER, AND METHOD

FIELD OF THE INVENTION

This invention relates generally to vehicles having steerable wheels carried on a split king pin spindle assembly, and more particularly to an improved method and structure for correcting the camber setting of the steerable wheels of such vehicles.

BACKGROUND OF THE INVENTION

Of the conventional alignment adjustments and corrections normally required for the steerable wheels of a vehicle, other than the universally provided toe-in adjustment, camber adjustment is generally considered to be the most important consideration. Camber involves the relationship of the plane of a wheel to the supporting surface, with perpendicular defined as zero camber, and a tilt of the upper wheel towards the opposite steerable wheel being defined as negative camber measured in degrees of tilt from perpendicular. Since the wheel normally is supported by a relatively wide tire "footprint" on the road, camber misalignment can cause an inner or outer edge of the tire to serve as the entire support of the vehicle at such wheel. Wide, high flotation tires, as are commonly used on four-wheel drive vehicles, amplify the problem.

Rigid axle vehicles, and particularly rigid axle four-wheel drive having steering knuckles and stub king pins are not designed with means for camber adjustment. However, despite the robust nature of such axles, the heavy use to which the axles are often put often result in camber misalignment.

Apparently, other than bending the axle, two concepts are known for correcting camber in split king pin solid axle four-wheel drive designs. The first involves the insertion of shim members between the spindle knuckle and spindle to vary the angle of the spindle, and accordingly the wheel camber. An example of this design is to be found in U.S. Pat. No. 4,037,680 issued to Clinton E. Grove. It should be noted that the Patent illustration is of a ball joint design dissimilar from that to which the instant invention pertains. While the Grove concept is applicable to split king pin designs, it is not useful with the now near standard disk brake since the disk hat is supported to the hub journalled on the spindle while the calipers are mounted on the spindle knuckle. Thus, if the spindle angle is varied relative to the spindle knuckle, the disk will not be true to the caliper orientation. In addition, removal of the spindle from the spindle knuckle involves a very significant effort.

Another available device uses a cam plate mounted in place of the Grove shim. By rotating the cam plate, various camber settings may be obtained without removal of the spindle. This second approach suffers the same drawbacks as does that of Grove with regard to disk brakes and initial installation.

SUMMARY OF THE INVENTION

The present invention relates to an improved vehicle alignment structure and method in which a king pin member having a fixed or movable offset king pin stub is positioned in a knuckle axle structure in such a manner that various degrees of camber correction may be accomplished as a function of the amount of offset of the king pin stub. Offset is determined in most instances by the nonconcentricity of the king pin stub and the pilot or indexing portion of the king pin member. Both the spindle knuckle and spindle are displaced by the king pin member thereby allowing for camber correction even in the event the spindle knuckle carries disk brake structure.

Installation of the fixed offset king pin member is conveniently executed. In most instances, removal of but four fasteners enable a king pin member to be separated from the spindle knuckle. Depending upon the camber correction required, an appropriate king pin member with the desired king pin stub offset is selected and inserted into the spindle knuckle. Replacement of the four fasteners completes the camber correction. Since camber correction changes toe settings, this should be adjusted after camber correction. As will be apparent, simplicity, and installation ease and convenience are among the more attractive attributes of the instant invention.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is an exploded view of a closed knuckle axle assembly in accord with the instant invention illustrating the relationship of the king pin member in the assembly;

FIG. 2 is a cut away view of the axle assembly of FIG. 1;

FIGS. 3 and 4 are perspective views of the king pin member of the instant invention illustrating the position of the offset king pin stub on the king pin member with the conventional position of the king pin stub shown in a ghosted fashion; and FIG. 5 is an exploded view of another embodiment of a king pin stub of the instant invention illustrating an undercut configuration, which enables installation in a particular type of axle assembly, and rotatable eccentric king pin stub.

DESCRIPTION OF THE INVENTION

The structure, problems and geometry of camber correction in generic solid axle four-wheel drive vehicles are well known and discussed in some detail in U.S. Pat. No. 4,037,680, which is hereby incorporated by reference.

Turning now to the drawings, in which similar components are designated by like reference numerals throughout the various figures, the salient portion of a split king pin knuckle axle assembly is shown in FIGS. 1 and 2, and generally designated by reference numeral 10. As shown, closed knuckle axle assembly 10 includes axle housing 12 which terminates at axle ball 13. Upper bearing race 14 and lower bearing race 15 are defined in opposed positions in axle ball 13. Axle assembly 20, which includes inner axle 22, constant velocity joint 24 and outer axle 26, extends into axle housing 12 at one end to connect with the drive differential (not shown) at one end and to a wheel hub (not shown) at the other. Seal 28 on spindle knuckle 30 bears against axle ball 13 to permit sliding but sealed movement between axle ball 13 and spindle knuckle 30. In other functionally equivalent embodiments, axle ball 13 is replaced by a yoke configuration, which is not sealed.

Spindle 32 is carried on spindle knuckle 30 and sealed by member 33 therebetween. Member 33 is the portion of closed knuckle axle assembly 10 which would be replaced by a shim according to the above-discussed Grove patent. Outer axle 26 is supported within spindle 32 and in turn is connected to drive the wheel hub (not shown).

The above structure is conventional but necessary to the novel structure of the instant invention. Novel lower king pin member 35, shown in FIGS. 3 and 4, and upper king pin member 36 are functionally similar except upper king pin member 36 is attached to steering arm 38. Each of lower and upper king pin members 35 and 36 are spaced by shims 37 and engage bearings 39 which, in turn, are received in bearing races 14 and 15. Bearings 39 determine caster and related steering geometry which is not altered by the camber correction discussed herein. Spindle knuckle 30 has defined therein openings 40 at the top and bottom thereof. King pin members 35 and 36 each have a pilot annulus 42 which fit in openings 40. King pin stubs 44 project in a nonconcentric or offset fashion from each pilot annulus 42 and are received in bearings 39. Conventional king pin members (not shown) have king pin stubs concentric with the pilot annulus and provide no camber correction. Thus when assembled as shown in FIG. 2, spindle knuckle 30 is rotatable relative to axle ball 13 by means of bearings 39 at offset king pin stubs 44 and bearing races 14 and 15, respectively. Such rotation permits steering action. King pin members 35 and 36 each are secured by studs 46 projecting from spindle knuckle 30 through holes 47 in king pin members 35 and 36 and with nuts 50.

To correct camber, existing wheel camber is determined in a conventional manner. The desired correction is then established and an appropriate offset king pin member 35, for instance, is chosen. Nuts 50 are removed, the existing king pin member, which may be conventional, is merely pulled out, new king pin member 35 pushed in with some movement of spindle knuckle 30 to assist in locating king pin stub 44 in bearing 39, and nuts 50 are replaced. In some instances, seal 28 will require adjustment.

In the above example rotation of spindle knuckle 30 is centered around king pin member 36. While this is less desirable than rotation centered around constant velocity joint 24, for adjustment of up to 1.5 degrees, seal 28 and other compliance in closed knuckle axle assembly 10 are more than adequate. For larger camber corrections, it may be desirable to provide half the offset in each of king pin members 35 and 36. This less convenient procedure provides the theoretically correct movement around constant velocity joint 24.

Another embodiment of a novel king pin member in accord with the instant invention is shown in FIG. 5 and generally indicated by numeral 35'. King pin member 35' includes pilot annulus 42', king pin stub 44' and holes 47' which are functionally similar to the corresponding components described above. However, spaced annulus 55 is positioned adjacent king pin stub 44' to provide a shoulder for the bearing, such as bearing 39 shown in FIG. 1, to rest upon. Spaced annulus 55 is located eccentric to pilot annulus 42' as can be noted by the offset of the two centerlines shown. Undercut 57 is defined in spaced annulus 55 to facilitate installation. Hole 56 is defined through king pin member 35' to permit rotation of king pin stub 44' relative to king pin member 35' at cylindrical portion 59, and includes hexagonal portion 60 to allow rotation with a wrench. Threaded section 62 with locknut 64 serve to preclude rotation when proper adjustment is obtained.

Installation of king pin member 35' is similar to that for king pin member 35 described with regard to FIG. 1. Spaced annulus 55 is initially inserted in a spindle opening, such as opening 40 of FIG. 1 with king pin stub 44' engaging an adjacent bearing. Then king pin member 35' is moved further into the opening such that undercut 57 is within the opening in order that king pin bearing 35' may be moved laterally to position annulus 42' concentric with the opening. This also aligns holes 47' to permit bolts (not shown) to be inserted to secure king pin member 35'. With king pin member 35' secured, final adjustment is made by backing off locknut 64, rotating eccentrically mounted king pin stub 44' until proper camber is realized, and fixing the adjustment by tightening locknut 64. King pin member 35', while a somewhat more involved design, is in some respects a preferred embodiment in that one unit affords a range of externally adjustable settings rather than removal and replacement of fixed offset king pin member 35. But the latter embodiment has cost and simplicity advantages.

From the above discussion, it is apparent that the instant invention provides a simple means for correcting camber in split king pin solid axles. Instead of conventional king pin members, novel members with offset king pin stubs are employed. Offset is determined by the amount of nonconcentricity between the pilot annulus, or similar indexing projection, and the associated king pin stub. When installed in accord with the method of the instant invention, such offset causes the spindle knuckle to rotate. Resulting movement towards or away from the spindle increases or decreases camber. Rotation in the direction of wheel rotation does not change alignment parameters.

While only limited configurations of the specific embodiments of the invention have been shown for purposes of illustration, it is expected that those skilled in the art will recognize a number of equivalent configurations, and that the scope of the invention is to be limited only by the limits of the following claims.

What is claimed is:

1. In an axle assembly including a driven and steerable wheel, the axle assembly comprising:
   an axle;
   a yoke structure defined at an end of the axle, the yoke including upper and lower king pin locating means;
   a steering knuckle having upper and lower pilot openings defined therein;
   upper and lower first king pin means, each having indexing means adapted to fit the corresponding pilot opening, and each having a king pin stub in the form of a cylindrical shaft with an axis nominally positioned relative to the indexing means, each king pin stub being positioned in one of the yoke king pin locating means to secure the steering knuckle to the yoke with the yoke being rotatably movable at the king pin stub; and a spindle defining an axis and extending from the steering knuckle, the spindle being adapted to support a wheel for rotation around the spindle axis;

the improvement comprising:

an asymmetric king pin means with an asymmetric king pin stub positioned on the indexing means with the asymmetric king pin stub axis displaced from the nominal axis of the first king pin stub in a direction parallel to the spindle axis;

whereby the asymmetric king pin means will rotate the steering knuckle and spindle relative to the yoke to change the camber relationship of the spindle relative to the yoke when positioned in place of the first king pin means.

2. The improvement as set forth in claim 1 in which:

the indexing means of the king pin means comprises an annular boss configured to fit within the steering knuckle pilot openings, the boss having a first axis, and the king pin stub being cylindrical along at least a portion thereof around a second axis, the first and second axes being parallel but offset one from the other.

3. The improvement as set forth in claim 2 in which:

the annular boss has defined therethrough a hole concentric with the first axis;

the king pin stub is carried on a rotatable member journalled in the hole; and means to releasably secure the rotatable member against rotation in the hole are included.

4. The improvement as set forth in claim 3 in which:

the rotatable member has defined thereon at a position adjacent the king pin stud a spaced cylindrical annulus concentric with the second axis and defined at the portion immediately adjacent the king pin stud by a bearing support surface, and also includes an undercut portion defined in the spaced annulus at the portion thereof opposite the bearing support surface.

5. A method for adjusting camber in a rigid, hollow axle assembly having a yoke defined at a terminus thereof, and which includes a steering knuckle supporting a wheel and a spindle, the steering knuckle having index openings defined therein, and removable king pin members positioned in the openings by pilot means, the king pin members including king pin stubs defining an axis located on the pilot means and engaging the yoke with rotation freedom around the axis of the king pin stubs, and releasable fasteners securing the king pin members in the steering knuckle openings, the method comprising:

removing at least one king pin member from the steering knuckle; and installing an asymmetric king pin member with a king pin stub having an axis orientation relative to the pilot means differing from that of the removed king pin member by an offset in a direction along the spindle axis when installed to move the steering knuckle relative to the yoke by the amount of the offset difference between the two king pin members, whereby the wheel camber may be changed as a function of the offset difference.

* * * * *